Dec. 18, 1934.  R. E. WISSMAN  1,984,908
STRAIGHT SIDE SINGLE CRANK PRESS
Filed Feb. 23, 1932  3 Sheets-Sheet 3
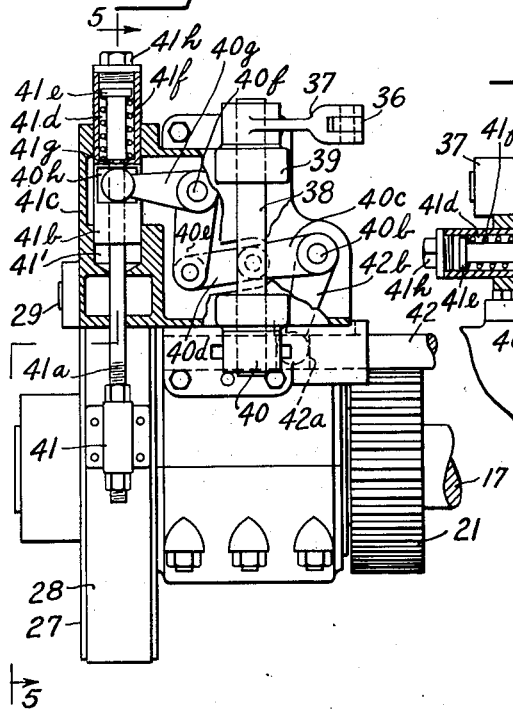
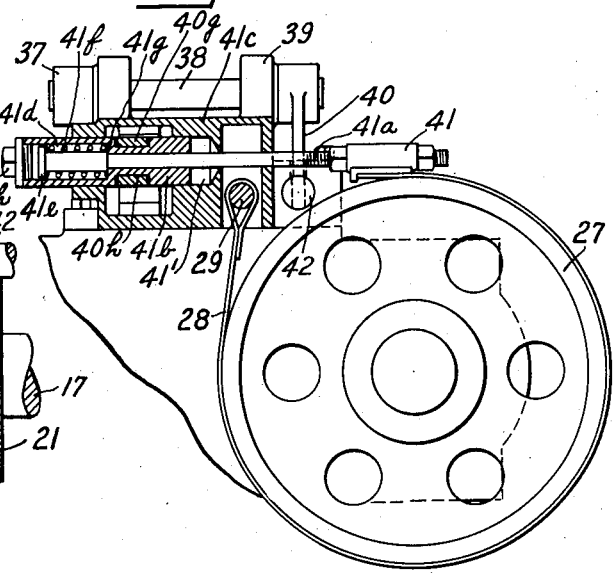
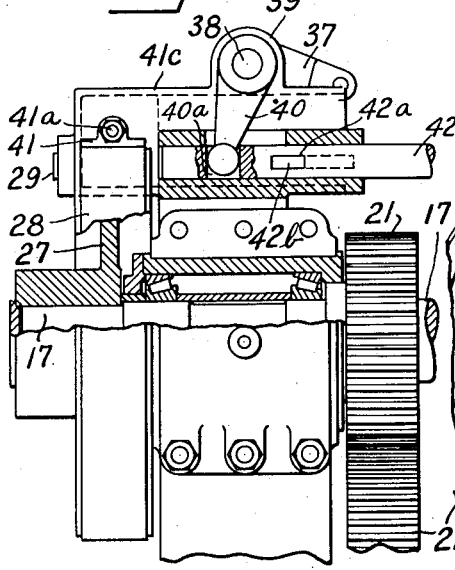
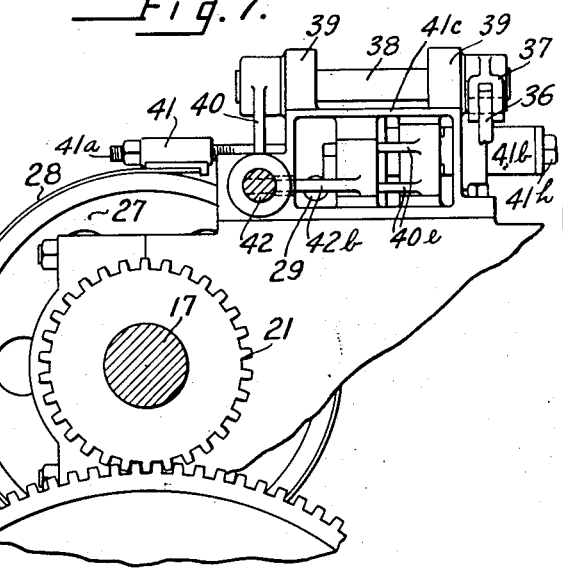
INVENTOR
REUBEN E. WISSMAN.
BY
ATTORNEYS Patented Dec. 18, 1934

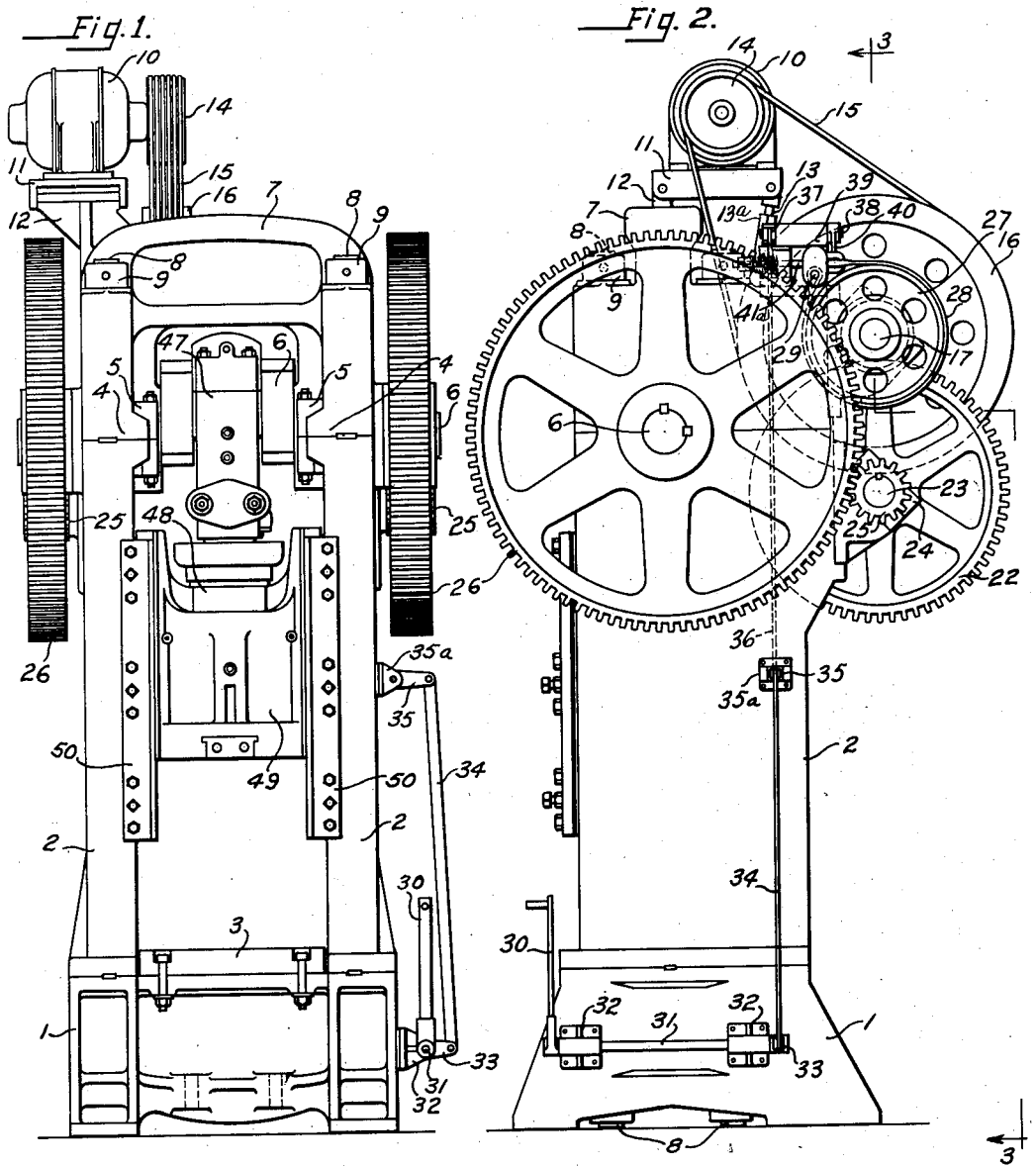

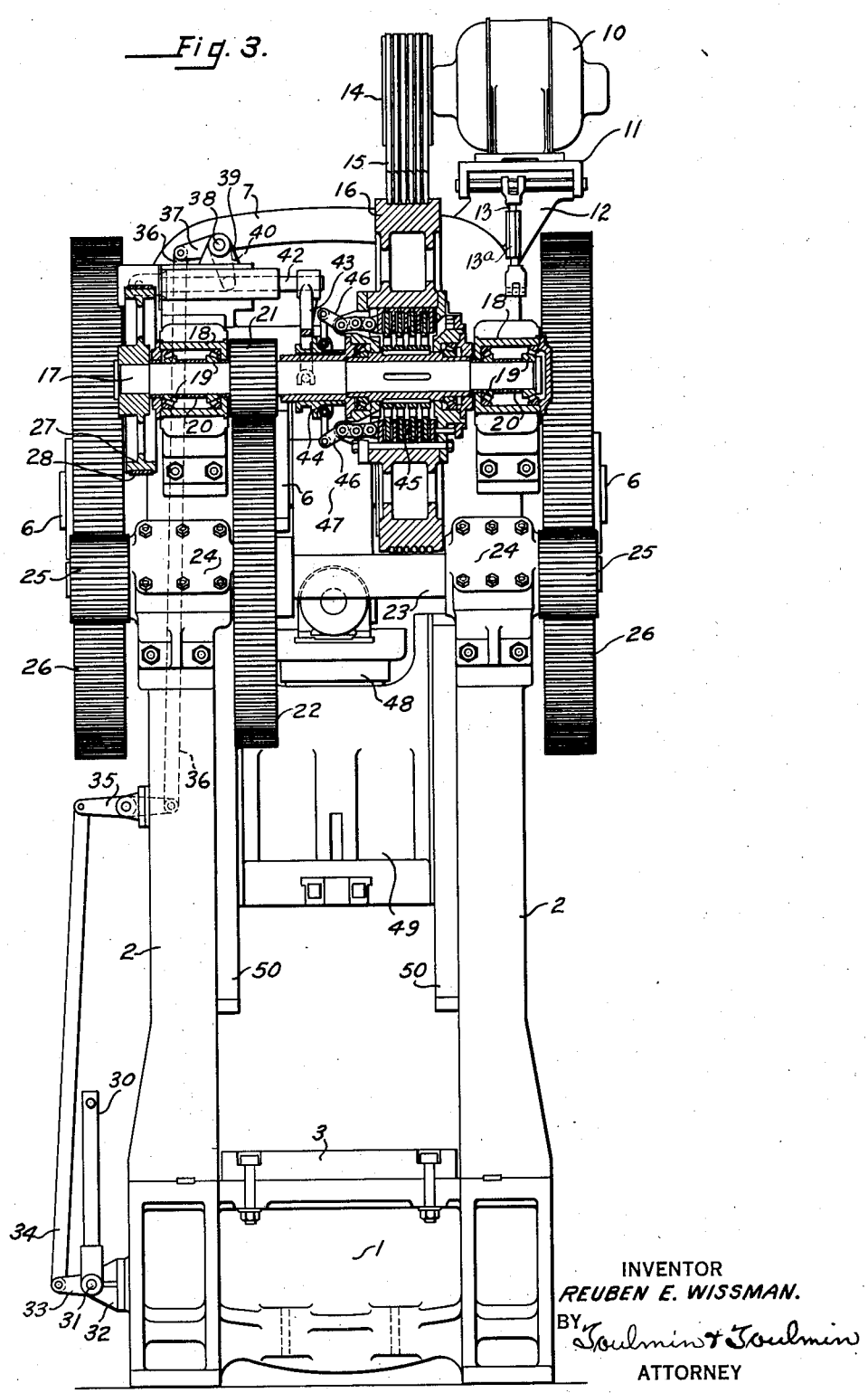

1,984,908

UNITED STATES PATENT OFFICE 1,984,908

STRAIGHT SIDE SINGLE CRANK PRESS

Reuben E. Wissman, Minster, Ohio, assignor to The Minster Machine Company, Minster, Ohio, a corporation of Ohio Application February 23, 1932, Serial No. 594,561

16 Claims. (Cl. 192—144)

This invention relates to improvements in presses, and has for its object to provide a straight side, single crank press of a simplified and compact design, in which the operating parts are located between or adjacent uprights or standards which form supports for the operating mechanism and in which the moving parts act upon each other to apply power in straight lines.

It is particularly the object of this invention to provide a press in which power is transmitted from a drive shaft to the parts moved by the drive shaft so that the power is transmitted along straight lines and equally distributed to means for operating the reciprocating part of the press.

It is particularly the object of this invention to provide, in connection with a drive shaft, means for driving the shaft including a clutch connection between the shaft and the means for driving the shaft, and immediately adjacent the clutch means a means for transmitting power to a gear mechanism for causing the reciprocation of a reciprocating member.

It is also an object of this invention to provide, in connection with a drive shaft, a pulley on the shaft having a clutch connection between the shaft and the pulley and the brake mechanism on the shaft, and means for operating the brake and the clutch in conjunction so that when the clutch is in engagement the brake is free and when the brake is operating the clutch is free.

The object of this invention is to provide a driving shaft having spaced bearings mounted on the frame of the press, between which bearings is located the driving pulley, inside of which is the clutch and along side of which, between the clutch and the pinion mounted on the driving shaft, is located the actuating mechanism for the clutch.

By this arrangement the two spaced bearings have firm foundation upon the frame of a press used for forging and metal bending, and can be utilized for also taking the strain of clutching and clutch-shifting and the application of the power to the driving pulley. By locating the clutch within the driving pulley, and placing the pulley between the bearings closely associated with the line of thrust of the press, and between the points of application of the power to the press, it is possible to so balance the press that the clutching and declutching operation can be effected with the minimum strain upon the bearings while still only utilizing two bearings. This reduces the overall lateral dimension of the press and enables a large number of presses to be assembled in a given area by being located closely adjacent one another, which hitherto has not been the case.

These and other advantages will appear from the following description taken in connection with the drawings.

Referring to the drawings:

Figure 1 is a front elevation of the press in operating condition.

Figure 2 is a side elevation of the press shown in Figure 1.

Figure 3 is a longitudinal vertical section on the line 3—3 of Figure 2, showing the drive pulley and the brake wheel and brake band in section.

Figure 4 is a top plan view of the clutch and brake operating instrumentality with a part of a containing casing broken away.

Figure 5 is a section on the line 5—5 of Figure 4.

Figure 6 is a view, partly in section, looking from the righthand side of Figure 5.

Figure 7 is a view showing the clutch and brake-operating mechanism from a point opposite that shown in Figure 5.

The frame part of the press is composed of a base or bed 1, standards 2 and a crown piece 7. In the present instance there are two of the standards, which have between them, resting upon the bed and suitably attached thereto by any convenient means, a bolster plate 3. The upper parts of the standards are formed into sections that provide bearings 4, which have adjacent thereto bearing caps 5 for a transversely and horizontally arranged crank shaft 6.

The base, the standards and the crown piece 7 are held to one another by means of tie rods 8 and nuts 9 on the ends of the tie rods. These tie rods not only serve to hold these parts together but serve to hold the bearings assembled in the crank shaft.

For operating the moving parts of the press there is provided a motor 10, mounted upon a platform 11, pivoted at one end to a bracket 12 which extends from one part of the crown piece. In the present instance this bracket 12 extends laterally and upwardly from one end of the crown piece and substantially above one of the standards. In order that the motor platform may be adjusted so that the tension on a belt 15 on the end of the motor shaft may be regulated, an adjustable link 13 having thereon a turnbuckle 13a is provided. This link may be adjusted by any suitable means.

The motor shaft is provided with a pulley 14, around which the belt 15 extends, and around a second pulley 16 loosely mounted to rotate on a drive shaft 17. The pulley 16 may be caused to rotate with the shaft by means of a block clutch, later to be described. The drive shaft is supported at or adjacent its ends by means of bearings in the standards. The bearings consist of a retainer 18 having therein, around the shaft, roller bearings 19, as clearly shown in Figure 3. Each bearing on each standard is in two parts, separated from each other by means of a bearing spacer 20.

The pulley 16, with its clutch mechanism, is located on the drive shaft adjacent one of the bearings, while adjacent the other bearing and on the same shaft and fixed thereto, is a drive pinion 21. Between the pulley and its clutch mechanism, and on the drive shaft 17, is a clutch actuating sleeve. The drive pinion meshes with a relatively large gear 22, fixed to a shaft 23 mounted for rotation in bearings 24 on the standards. This shaft 23 extends over the bearings at each end, and has on its ends pinions 25, each of which meshes with a gear 26 on the end of the crank shaft on the outside of the standard and adjacent the standard.

One end of the drive shaft extends beyond its bearing and has mounted thereon a brake drum or pulley 27, around which there extends a brake band 28, one end of which is fixed to a pin or some other suitable support means 29, as shown in Figure 2. Located on the bed is a handle 30, the lower end of which is attached to a shaft 31 supported on the bed by means of brackets 32.

The handle is on one end of the shaft 31, while on the other end of the shaft 31 is a shift arm or lever 33, to the free end of which is attached one end of a trip rod 34, which has its other end attached to one end of a lever 35 pivoted intermediate its ends to a bracket 35a on one of the standards. To the other end of this lever 35 is attached one end of a rod 36, which extends upwardly and has its other end attached to one end of a lever 37, the other end of which is attached to a shaft 38 supported for rotation in a bracket 39. The other end of this shaft 38 has attached thereto a short arm or lever 40 extending into a mortise 40a in a clutch operating rod 42 for operating the clutch shifting mechanism.

The end of the brake band remote from the fixed end 29 has thereon a sleeve 41, which has therein one end of a rod 41a. The rod 41a has thereon a block 41b slidably movable within a chamber 41' in a housing 41c. The end of the rod 41a within a chamber 41d has thereon a head 41e. Between this head and a shoulder 41g on the block 41b is a spring 41f.

One end of the chamber 41d is open and for the purpose of closing it there is a screw threaded plug 41h. This plug not only serves to close one end of the chamber but it also serves to limit the movement of the rod 41a in moving the brake band. The relation of the rod 41a to the brake band may be adjusted by means of nuts on the rod engaging opposite sides of the sleeve 41.

The rod 42 has therein, adjacent the mortise 40a, a mortise 42a disposed at right angles to the mortise 40a. In this mortise 42a is one end of an arm 42b attached at its other end to a shaft 40b suitably supported on top of the press spring. Extending from the shaft 40b, integral with the arm 42b, is an arm 40c connected by means of a link 40d to one end of an arm 40e supported at its other end by means of a shaft 40f. Rigidly connected to the arm 40e is one end of an arm 40g, the other end of which extends into notches 40h on opposite sides of the block 41b.

Operated by the lever or arm 40 is a clutch operating rod 42, which has on one end thereof means for causing the member 41a to move to tighten the brake band. On the other end of this rod 42 is a clutch yoke 43, which extends around a clutch sleeve 44 mounted upon the drive shaft 17. Between the clutch 45 and the clutch sleeve is a toggle mechanism 46 for operating the clutch. The clutch is located between the pulley 16 and the drive shaft, and is operated by means of the clutch yoke, the sleeve and the toggle to cause the pulley to rotate with the shaft or to rotate independent of the shaft.

When the lever 30 is operated to release the clutch the brake band is tightened. In Figure 3 the clutch is in position to cause the operating shaft to rotate with the pulley driven by the motor. At the same time the arm and link structure operates to release the brake band by moving the rod 41a to the right, as shown in Figure 5. When the lever 30 is operated to cause the clutch members to disengage the rod 41a is moved to the left, as shown in Figure 5, to cause the brake band to grip the drum. The operation of the drum and the clutch is simultaneous and is brought about through the rocking of the shaft 38 and the longitudinal movement of the rod 42. The rod 42 is interconnected with the rod 41a, through the arm and link structure shown in Figure 4.

The crank part of the crank shaft 6 is located between the two standards and has connected thereto the upper end or connection of a connecting rod 47. The lower part of this connection is indicated by the numeral 48, and is connected to a slide 49 adapted to move vertically up and down between the standards and guided by plates 50 attached to the standards.

When the motor is in operation and the clutch is in the position shown in Figure 3, the drive shaft rotates and through its rotation, rotates the shaft 23 and the crank shaft. It will be noted from an examination of Figure 3 that there is almost a direct drive from the motor pulley to the gear 22, which is located on the shaft 23 between the two standards. This shaft 23 is caused to rotate by direct application of power from the pinion located on the drive shaft.

Each end of shaft 23 is caused to rotate under the same conditions so that the pinions on the ends of this shaft in mesh with the gears 26 tend to produce a rotation in the crank shaft 6 that is uniform for all parts of the shaft. That is, equal rotating force is applied to each gear 26. By this means equal rotating force is applied to the connection 47, from both ends of the crank shaft. This equal application of force tends to cause a vertical movement of the slide 49 independent of any guiding effect the standards may have thereon.

The problem in building a press of this type is to reduce the number of bearings and to bring the operative parts, such as the driving pulley, the clutch and the clutch actuating mechanism and the means for transmitting the power from the driving shaft to the press, as nearly in line with the center line of the press as possible, thus reducing vibration, reducing the strains in the press and enabling a lighter, stronger construction to be accomplished without sacrificing the efficiency of the press.

What is claimed is:

1. In a press, a drive shaft supported in bearings, one adjacent each end of the shaft, a drive pinion on the shaft adjacent one bearing, and driving means on the shaft between the pinion and the other bearing, said driving means including a pulley and clutch means between the pulley and the shaft.

2. In a press, a drive shaft supported in bearings, a drive pinion and a pulley on the shaft between the bearings, a clutch for connecting the pulley to the shaft, braking means for the shaft, and means for operating the clutch and the braking means so that when the braking means is on the clutch is released.

3. In a press, spaced bearings mounted on a press frame, a driving shaft mounted therein, a driving pulley having an internal clutch mounted thereon between the bearings, clutch actuating mechanism mounted thereon between the bearings, and a driving pinion mounted on said shaft between the bearings, said driving pulley, clutch, clutch actuating mechanism and pinion being closely associated and distributed about the center line of the press.

4. In a press, spaced bearings mounted on a press frame, a driving shaft mounted therein, a driving pulley having an internal clutch mounted thereon between the bearings, clutch actuating mechanism mounted thereon between the bearings, and a driving pinion mounted on said shaft between the bearings, said driving pulley, clutch, clutch actuating mechanism and pinion being closely associated and distributed about the center line of the press, said clutch actuating mechanism being located between a driving pinion and the clutch on the one hand and a driving pinion and the bearings on the other hand.

5. In a press, a pair of standards, a motor adjustably mounted on the standards, a drive shaft rotatably mounted on the standards and having thereon between the standards a pinion and a pulley, a belt connecting the pulley to the motor, and a clutch between the pulley and the shaft.

6. In a press, a crank shaft, means operating on each end of the crank shaft to rotate it, a drive shaft, a clutch-controlled means to rotate the drive shaft, and means adjacent the last-named means to operate the first-named means, the parts being so arranged that the power is transmitted in direct lines and equally distributed to rotating parts.

7. In a press, a crank shaft, means operating on each end of the crank shaft to rotate it, a drive shaft supported at each end, a clutch-controlled means to rotate the drive shaft, and a power-multiplying means between the drive shaft and the first-named means to operate the first-named means, the parts being so arranged that the power is transmitted in direct lines and is equally distributed to rotating parts.

8. In a press, a pair of standards having a reciprocable member therebetween, a crank shaft supported by the standards and operatively connected to the reciprocable member, a gear on the crank shaft adjacent each standard, a second shaft supported by the standards, a pinion on the second shaft for each gear, a gear on the second shaft between the pinions, and means engaging the last-named gear to cause it to rotate, whereby all the shafts will rotate, said last-named means including a drive shaft having thereon a pinion engaging the last-named gear.

9. In a press, a pair of standards having a reciprocable member therebetween, a crank shaft supported by the standards and operatively connected to the reciprocable member, a gear on the crank shaft adjacent each standard, a second shaft supported by the standards, a pinion on the second shaft for each gear, a gear on the second shaft between the pinions, means engaging the last-named gear to cause it to rotate, whereby all the shafts will rotate, said last-named means including a drive shaft having thereon a pinion engaging the last-named gear, and a pulley adjacent the pinion.

10. In a press, a pair of standards having thereon a reciprocable member, a crank shaft supported by the standards and operatively connected to the reciprocable member, a gear on the crank shaft adjacent each standard, a second shaft supported on the standards, a pinion on the second shaft for each gear, a gear on the second shaft between the pinions, a drive shaft on the standards having a pinion engaging the last-named gear, and means on the drive shaft adjacent the pinion thereon to cause the shafts to rotate.

11. In a press, a pair of standards having thereon a reciprocable member, a crank shaft supported by the standards and operably connected to the reciprocable member, a gear on the crank shaft adjacent each standard, a second shaft supported on the standards, a pinion on the second shaft for each gear, a gear on the second shaft between the pinions, a drive shaft on the standards having a pinion engaging the last-named gear, a pulley loosely mounted on the drive shaft, and a clutch for causing the pulley and the drive shaft to rotate together.

12. In a press, a pair of standards having thereon a reciprocable member, a crank shaft supported by the standards and operably connected to the reciprocable member, a gear on the crank shaft adjacent each standard, a second shaft supported on the standards, a pinion on the second shaft for each gear, a gear on the second shaft between the pinions, a drive shaft on the standards having a pinion engaging the last-named gear, a pulley loosely mounted on the drive shaft, a clutch for causing the pulley and the drive shaft to rotate together, a brake on the drive shaft, and means for moving the clutch and the brake at the same time.

13. In a press, a drive shaft, a pinion fixed to the shaft, a pulley loosely mounted on the shaft, a motor adjustably mounted in relation to the pulley and operatively connected to the pulley for causing the pulley to rotate, a clutch for causing the shaft to rotate with the pulley, a brake on the shaft, and means for operating the brake and connected to the clutch for operating the clutch at the same time.

14. In a press, a frame having thereon a rotatable shaft, a brake drum on the shaft, a brake band fixed at one end to the frame engaging the drum, means tending to hold the band against the drum, a pulley loosely mounted on the shaft, a clutch for causing the pulley and shaft to rotate together, and a rod having means on one end to operate the clutch and means on the other end operating through the first-named means to move the band against the drum.

15. In a press, a frame having thereon a rotatable shaft, a brake drum on the shaft, a brake band for the drum, one end of said band being fixed to the frame and the other end being adjustably and yieldingly attached to the frame for clamping the drum, a pulley loosely mounted on the shaft, a clutch for causing the shaft and pulley to rotate together, and a rod connected at one end by a yoke to the clutch and having means on the other end to operate the brake band to move the band against the drum.

16. In a press, a frame having thereon a rotatable shaft, a brake drum on the shaft, a brake band for the drum, one end of the band being fixed to the frame and the other end being adjustably and yieldingly attached to the frame, a rocking member on the frame connected to the other end of the band, a pulley loosely mounted on the shaft, a clutch for causing the shaft and pulley to rotate together, and a rod having on one end means to operate the clutch and on the other end means to engage the rocking member to cause the band to engage the brake drum.

REUBEN E. WISSMAN.